(12) United States Patent
Cecinas et al.

(10) Patent No.: US 9,604,725 B2
(45) Date of Patent: Mar. 28, 2017

(54) AIRCRAFT SEAT WITH A SINGLE-BEAM STRUCTURE AND AIRCRAFT COMPRISING SUCH A SEAT

(71) Applicant: EADS SOGERMA, Rochefort (FR)

(72) Inventors: Laurent Cecinas, Breuil Magne (FR); Julien Normandin, Marennes (FR); Remy Barre, Echillais (FR); Lionel Bacquey, Merignac (FR)

(73) Assignee: STELIA AEROSPACE, Rochefort (FR)

( * ) Notice: Subject to any disclaimer, the term of this patent is extended or adjusted under 35 U.S.C. 154(b) by 170 days.

(21) Appl. No.: 13/911,271

(22) Filed: Jun. 6, 2013

(65) Prior Publication Data

US 2013/0328364 A1 Dec. 12, 2013

(30) Foreign Application Priority Data

Jun. 6, 2012 (FR) ..................... 12 55279

(51) Int. Cl.
| | |
|---|---|
| *B60N 2/42* | (2006.01) |
| *B60R 21/00* | (2006.01) |
| *B64D 11/06* | (2006.01) |
| *B60N 2/427* | (2006.01) |
| *B64D 25/04* | (2006.01) |

(Continued)

(52) U.S. Cl.
CPC ............ *B64D 11/0696* (2013.01); *B60N 2/20* (2013.01); *B60N 2/309* (2013.01); *B60N 2/3031* (2013.01); *B60N 2/3065* (2013.01); *B60N 2/427* (2013.01); *B60N 2/4242* (2013.01); *B60N 2/42709* (2013.01); *B64D 11/06* (2013.01); *B64D 11/064* (2014.12); *B64D 11/0619* (2014.12); *B64D 11/0649* (2014.12); *B64D 11/0689* (2013.01); *B64D 25/04* (2013.01); *B60N 2/16* (2013.01); *Y02T 50/46* (2013.01)

(58) Field of Classification Search
CPC ............ B64D 11/06; B64D 2011/0603; B64D 2011/0627; B64D 2011/0631; B64D 2011/0689; B64D 11/0619; B64D 11/0689; B60N 2/42709; B60N 2/4242; B60N 2/16
USPC .......... 297/216.1, 354.1, 452.19, 357, 452.2, 297/216.2, 216.17, 216.13, 340, 452.18, 297/411.36, 344.12, 344.18, 338
See application file for complete search history.

(56) References Cited

U.S. PATENT DOCUMENTS

| | | | |
|---|---|---|---|
| 2,331,309 A | 10/1943 | Curriston | |
| 2,383,173 A * | 8/1945 | Watter | B64D 11/06 248/393 |

(Continued)

FOREIGN PATENT DOCUMENTS

| | | |
|---|---|---|
| DE | 101 08 741 | 9/2002 |
| DE | 10 2008 056661 | 5/2009 |

(Continued)

OTHER PUBLICATIONS

French Search Report dated Feb. 19, 2013, corresponding to the Foreign Priority Application No. 12 55279.

*Primary Examiner* — Chi Q Nguyen
(74) *Attorney, Agent, or Firm* — Young & Thompson

(57) ABSTRACT

An aircraft seat includes a seat bucket that is integral by its seatback with a single beam oriented along an axis that is approximately perpendicular to the aircraft floor, which beam is integral with fastening points located on at least two separate lines on the aircraft floor.

17 Claims, 5 Drawing Sheets

(51) Int. Cl.
  *B60N 2/20* (2006.01)
  *B60N 2/30* (2006.01)
  *B60N 2/16* (2006.01)

(56) References Cited

U.S. PATENT DOCUMENTS

| | | | |
|---|---|---|---|
| 3,059,966 A * | 10/1962 | Spielman | 297/216.17 |
| 3,305,264 A * | 2/1967 | Gunn | B64D 11/0689 |
| | | | 248/420 |
| 3,532,379 A | 10/1970 | Reilly et al. | |
| 3,625,563 A * | 12/1971 | Dickinson et al. | 297/333 |
| 3,985,388 A * | 10/1976 | Hogan | 297/216.17 |
| 4,408,738 A * | 10/1983 | Mazelsky | 244/122 R |
| 4,523,730 A * | 6/1985 | Martin | 244/122 R |
| 4,525,010 A | 6/1985 | Trickey et al. | |
| 5,558,301 A * | 9/1996 | Kerdoncuff et al. | 244/122 R |
| 5,676,336 A * | 10/1997 | Nefy et al. | 244/122 R |
| 5,692,705 A | 12/1997 | Bellais | |
| 5,758,859 A * | 6/1998 | Gonzalez | B60N 2/4235 |
| | | | 248/420 |
| 6,224,154 B1 * | 5/2001 | Stoki | 297/339 |
| 6,237,889 B1 * | 5/2001 | Bischoff | 248/622 |
| 6,267,440 B1 * | 7/2001 | Hoffman | 297/216.1 |
| 6,742,838 B1 * | 6/2004 | Swierczewski | 297/216.1 |
| 7,744,155 B2 | 6/2010 | List et al. | |
| 8,342,300 B2 | 1/2013 | Guillon | |
| 8,408,643 B2 * | 4/2013 | Honnorat | B64D 11/0619 |
| | | | 244/122 R |

FOREIGN PATENT DOCUMENTS

| | | |
|---|---|---|
| EP | 0679573 | 11/1995 |
| EP | 0 716 980 | 6/1996 |
| EP | 2 028 040 | 2/2009 |

\* cited by examiner

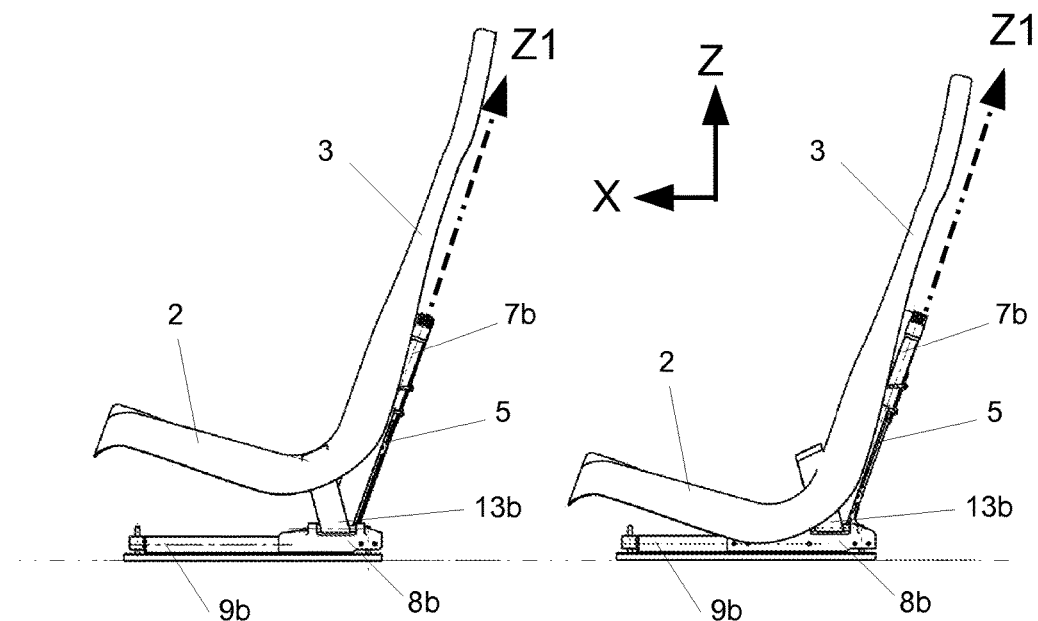
Fig. 7d
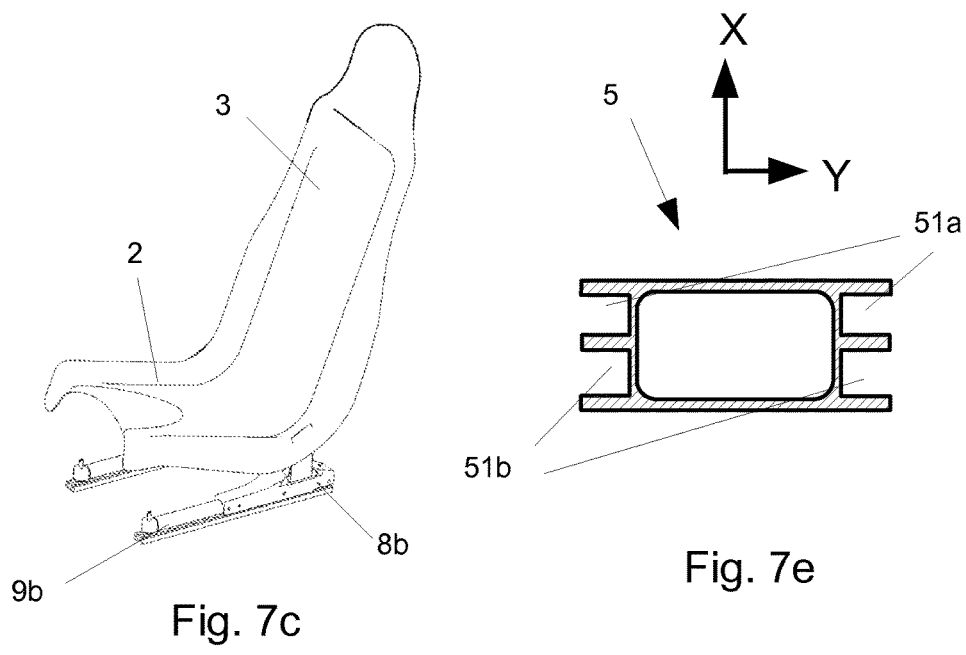
Fig. 7c
Fig. 7e

AIRCRAFT SEAT WITH A SINGLE-BEAM STRUCTURE AND AIRCRAFT COMPRISING SUCH A SEAT

BACKGROUND OF THE INVENTION

This invention falls under the general field of aircraft seats. It relates more specifically to the structure of the seats that are installed in the cockpit or the cabin of an aircraft. Still more specifically, but not in a limiting way, the objects of the invention are seats that are particularly suited to helicopters. Such seats are installed either in the pilot compartment or in a rear position for the passengers of the helicopters.

The design of such seat structures is subject to several requirements, including ergonomic requirements and requirements with regard to safety.

Actually, the normal accelerations to which the aircraft are subjected and the taking into account of extreme cases, such as various crash conditions, call for a mechanical strength for the structure in a large number of cases of static and dynamic loads for which the integrity of the structure of the seats during the use of the aircraft must be ensured.

The seat structures must also provide a certain number of functionalities necessary within the framework of their use (height adjustment/angle of the seat pan and/or of the seatback, of the armrests, of the headrest . . . ).

Taking these constraints into account necessitates the use of devices involving a considerable increase in the weight of the seats. Now, one of the problems of aircraft is to reduce weight as much as possible to save energy necessary for the flight of the aircraft, as well as its performance, without reducing the level of safety of the onboard devices for which the formal requirements are becoming increasingly restrictive.

To respond to these various requirements, there are known within the field of seat structures, in particular for technical seats, various solutions (FIGS. 1 to 5) that are or have been applied, often adapted to one aircraft type or a particular aircraft environment.

A first known device (FIG. 1) uses a telescopic column. In this solution, a seat is integral with a tube with a vertical axis placed under the seat, sliding in a base fastened to the floor of the aircraft. The height adjustment is obtained by extension or retraction of two or more tubes sliding into one another. Their mounting ensures the rigidity of the lower part of the structure of the seat. The holding in position is ensured by a mechanical lock or a braked actuator incorporated into the assembly. The base is adapted to the interfaces of the support of the seat, for example by specific fastening points or by means of two parallel tracks provided with regularly spaced attachment points. The upper part of the seat, for example a bucket made of one or more articulated parts, is designed and adapted to the upper end of the column.

A second known device is of the parallelogram type.

In a first variant (FIG. 2), the feet are fastened to the support of the seat, generally by means of additional structures. These feet are articulated so as to allow an oscillation inducing the variation in height of the upper part along an arc and simultaneously a forward/rearward movement.

In a second variant (FIG. 3), the principle is similar, but the rotation points of the feet are located, offset toward the rear, in such a way that the vertical movement does not induce a notable forward/rearward movement, bearing in mind the vertical adjustment amplitudes.

The center line distance of the feet is a function of the interfaces with the support of the seat on the floor.

A third known seat structure is of the pantograph type (FIG. 4). In this arrangement, the crossed feet are connected to the support of the seat by means of an interface structure. They are articulated at each of their ends. Two of these articulations are associated with a sliding system to make possible the deformation of the pantograph and the vertical movement of the upper part of the seat.

A fourth known solution uses a console-type mounting (FIG. 5). In this solution, the low structure, composed of guide tubes or fittings and of triangulation bars, is connected to the support of the seat on the floor in a conventional way.

The upper part of the seat is integral with the lower structure and can be moved vertically along the fittings or guides. The width of the upper part is directly a function of the distance between the lower guide fittings or tubes.

The height adjustment and maintenance are ensured by a lock system connecting the lower and upper parts.

The inclination of the seatback is also controlled by a lock system that rests on the lower structure.

All of these solutions exhibit a certain complexity with numerous mechanical parts. Furthermore, because of their philosophy of attachment of the structure to the bottom of the seat and of preserving possibilities for adjustment of the vertical position, they exhibit difficulties for ensuring the resistance to longitudinal or vertical stresses, which can be compensated for only by an oversizing of the parts, which increases the total weight of the seat.

Another category of conventional solution is the rear column-type mounting, for example as described in U.S. Pat. No. 4,525,010 of Trickey, Netherway and Clifford of June 1985. In this mounting, the seat is attached by its seatback to two lateral tubes that are approximately vertical or slightly inclined rearward, while having the possibility of sliding along these tubes within the framework of a vertical position adjustment of the seat. These tubes are integral with the floor and with the ceiling of the cockpit of the aircraft. A shock absorber placed between the two lateral tubes, and integral, on the one hand, with the lateral tubes by its upper part, and, on the other hand, with the seat by its lower part, makes it possible to respond to vertical crash stresses.

Specialized seats mounted today in the cockpits of various helicopters have adopted this type of mounting, which makes possible the incorporation of numerous functionalities (height adjustment and angle of the seat pan, forward/rearward adjustment in the flight direction, systems for compensations of movements, dynamic absorption in the case of a crash, systems for attenuation of vibrations . . . ).

The various known variants of rear mountings are all based on the principle of two lateral structures rising on each side of the seatback of the seat bucket of the seat and making possible a good structural strength of the latter in the vertical, longitudinal, and lateral, with the various associated torsional moments. However, these systems have the drawback, on the one hand, of requiring a significant number of parts for each function, since it is necessary to duplicate each system on the two lateral structures, and therefore here again to generate weight, and, on the other hand, to link the complex structure of the seat associated with the different technical constraints to the width of the seat that depends essentially on ergonomic requirements and on the space available in the aircraft for the installation of the seat.

SUMMARY OF THE INVENTION

This invention therefore has as its object to eliminate these drawbacks by simplifying the structure of the seat while ensuring the same adjustment functionalities and an improved or at least equivalent mechanical strength.

The object of the invention is more particularly an aircraft seat comprising a seat bucket, which establishes a longitudinal direction X toward the front of the seat and a vertical direction Z toward the top of the seat, a seat bucket that comprises a seatback and a seat pan integral with the seatback.

The seat comprises a single structural beam, known as a guide beam, located in a rear part of the seat, oriented in an approximately vertical or inclined direction Z1 in relation to the vertical direction Z in the plane XZ determined by the longitudinal direction X and vertical direction Z, and the seat bucket is held in front of the guide beam by two attachment parts that are integral with the seatback on a rear face of the seatback and apart from one another in the direction Z1.

Such an arrangement makes it possible to obtain a structure of the seat that is particularly simple, strong and easily incorporated into an aircraft.

The inclination of the direction Z1 in relation to the vertical makes it possible to adapt the comfort of the seat by a user and/or to simplify the adjustment mechanisms.

To ensure an adjustment of the height of the seat bucket, an adjustment that can be done during assembly of the seat or by a user, the two attachment parts that are integral with the seatback slide along the guide beam in the direction Z1 and comprises a device for locking the position in the direction Z1 on at least one of the two attachment parts.

To meet the most general principle of fastening aircraft seats to standard tracks of fasteners incorporated in the floors of the cabins, the guide beam is integral with a structure for connecting the guide beam to the floor of the aircraft, and the connecting structure comprises at least four points for fastening to the floor that are distributed along two lines that are approximately parallel in the longitudinal direction X and that are apart, as a function of the separations of the fasteners at the level of the floor, from a vertical symmetry plane XZ of the seat.

In one embodiment, the structure for connecting the guide beam to the floor comprises a mounting sleeve of the guide beam, with which sleeve four feet are integral and at the free ends of which feet the fastening points are placed.

In another embodiment, the guide beam is mounted in a structure of the floor, for example in a mounting sleeve that is integral with the structure of the floor of the aircraft. Such a solution proves particularly simple in terms of the structure of the seat.

To ensure an absorption of energy in case of a vertical crash, the guide beam slides in a direction parallel to Z1 in the sleeve and is held in the direction of sliding by a damping device with an approximately vertical axis, and, in an independent or combined manner, the feet are placed to absorb, by deformation, energy linked to a force of which a vertical component downward exceeds a predefined threshold.

In another embodiment, two feet of the same line of fasteners that is approximately parallel to the direction X of the connecting structure are rigidly connected to the guide beam, and two feet, rigidly integral with one another, of the other line of fasteners are fixed, articulated, along an axis Y oriented perpendicularly to the plane XZ, in relation to the sub-unit formed by the guide beam and the two feet that are rigidly connected to it. It is thus possible for the seat to support deformations of the floor that give rise to a twisting between the two fastening lines, whether this twisting results from normal deformations of the floor during the use of the aircraft or from exceptional deformations, envisioned in the certification requirements, during a crash situation.

In a particular embodiment that makes it possible to change the inclination of the guide beam in the plane XZ, the two feet of the same line of fasteners that is approximately parallel to the direction X of the connecting structure rigidly linked to the guide beam are linked by means of an articulation around the axis Y, and this articulation comprises a device for locking in rotation, a brake or pawl, for example.

To make possible the mounting of a seat in cabins whose fasteners to the floor have different distances in the longitudinal direction X, advantageously two feet of the same line of fasteners that is approximately parallel to the direction X comprise a part, called stationary, provided with an interface for a fastening point on the floor that is integral with the guide beam, and a part, called adjustable, also provided with an interface for a fastening point, the adjustable part being integral with the stationary part and being able to slide in relation to the stationary part in a direction X that is parallel to the lines of fastening points, with at least one space between two fastening points, or that can be changed in length in the direction X, either by adaptation of the adjustable part or by selection of an adjustable part from a set of adjustable parts of different lengths.

In the case of a guide beam and "non-deformable" connecting structure assembly, advantageously the absorption forces of the safety belt of the seat on the seat bucket are reduced when at each of its ends, the belt from the fastening point to the bucket passes through a first guide that is integral with the guide beam, located at a height greater than the attachment part on the bucket, then passes through a second guide that is integral with the foot of the corresponding side, located at a height lower than the first guide and at a height lower than the seat pan, and then rises above the seat pan. By this travel, which reduces the forces at the fastening points on the seat bucket, the length of the belt felt by the occupant of the seat is not appreciably changed when the height of the bucket is changed, in particular in a crash situation when the bucket descends under the effect of the vertical acceleration to absorb a portion of the energy, and the occupant is thus correctly held in his seat.

In a particular embodiment of a seat bucket that is adjustable in inclination in relation to the guide beam, one of the two attachment parts that are integral with the seatback comprises a pin for articulation of the seatback around an axis that is parallel to a direction Y that is perpendicular to the plane XZ, and the other attachment part comprises an element that can be extended for changing, locally, the distance from the seatback to the guide beam, an extension that causes the rotation of the bucket and its inclination around the pin.

Advantageously, the guide beam comprises at least two slides that are approximately symmetrical in relation to a vertical symmetry plane XZ of the guide beam, and in the slides, the attachment parts that are integral with the seatback are mounted to slide freely.

For example, the attachment part comprising an extendable element comprises at least two arms sliding in an anterior slide at independent ends and pivoting around a common axis parallel to the direction Y linked to the seatback at their other ends to form an angle that can be changed and therefore to change locally the distance between the seatback and the guide beam.

In one embodiment, the seat comprises a fastener in an upper part of the guide beam, for connection to a ceiling structure or to a structure of a bulkhead of the aircraft, by which the beam is held to the ceiling or to the bulkhead.

The invention also relates to an aircraft comprising one or more aircraft seats according to the invention so that the aircraft benefits from the reduced weight possible with the seats whose capacities, for adjustment in particular, can be different as a function of the purpose of the seat, pilot seat or passenger seat, and gains from a better use of the space of the cabin.

BRIEF DESCRIPTION OF THE DRAWINGS

The description and the drawings of a particular embodiment of the invention will make it possible to better understand the aims and advantages of the invention. It is clear that this description is given by way of example and has no limiting character.

In the drawings:

FIGS. 7a, 7b, 7c, 7d, 7e, 7f illustrate a particular embodiment of the invention, respectively in perspective as seen from the left rear (FIG. 7a), in view from the rear (FIG. 7b), in perspective view from the front (FIG. 7c), in left view for two seat-height positions (FIG. 7d), a view of an example of a guide beam in a straight cross-section (FIG. 7e), and a rear perspective detail of the seat of the belt device (FIG. 7f);

DESCRIPTION OF PREFERRED EMBODIMENTS

A seat according to the invention finds its place in an aircraft, oriented along a longitudinal axis of the aircraft, approximately facing or backing against a principal direction of movement of the aircraft during flight, fastened to a floor 100 on which are present one or more groups of two fastening tracks 110a, 110b that are parallel to one another and to the longitudinal axis of the aircraft, intended for the fastening of seats, or at least one set of seat-fastening points.

The seat is a seat for a pilot, fastened in a pilot compartment, or for a passenger, fastened in a cabin, of the aircraft.

Considered in this description are two tracks of fasteners, intended for the fastening of a seat, the spacing and characteristics of which are known to a person skilled in the art, and are therefore not described in detail here. In the description below, a reference X, Y, Z will be used for the longitudinal, transverse and vertical axes of the seat. Likewise, along the longitudinal axis X, the terms "forward" and "rear," corresponding to the direction of the seat, will be used, and in an equivalent manner, the terms "anterior" and "posterior."

Each of these tracks 110a, 110b comprises fastening sites, not explained in detail in the figures, which make it possible to attach a structure on these tracks, typically by bolting, these fastening sites being generally regularly spaced, with a standard spacing span, for example one inch.

Figure 1:
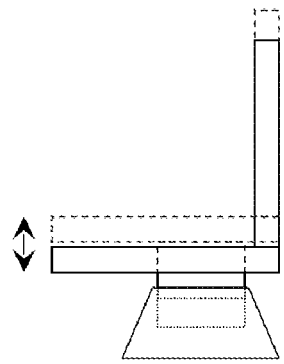
FIG. 1 illustrates diagrammatically a column-type seat, known to a person skilled in the art, seen from the side.
Figure 2:
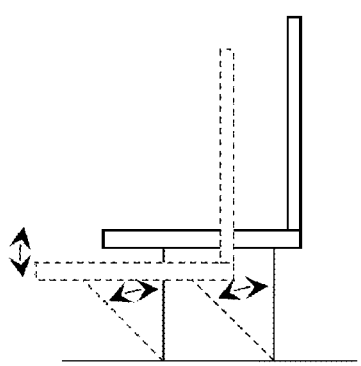
FIGS. 2 and 3 illustrate in the same way seats of the parallelogram type.
Figure 3:
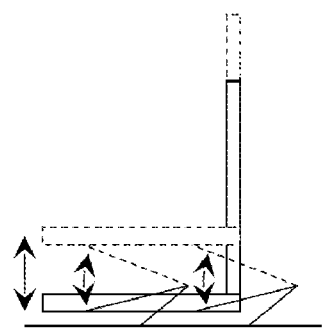
Figure 4:
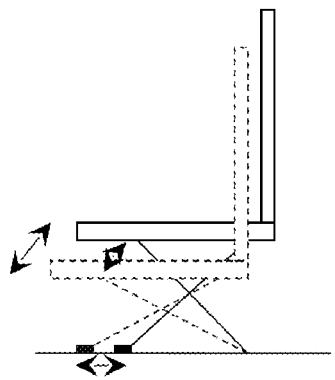
FIG. 4 illustrates in the same way a seat of the pantograph type.
Figure 5:
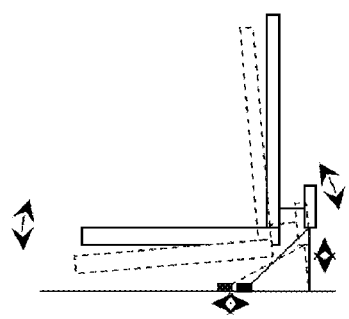
FIG. 5 illustrates in the same way a console-type seat.
Figure 6:
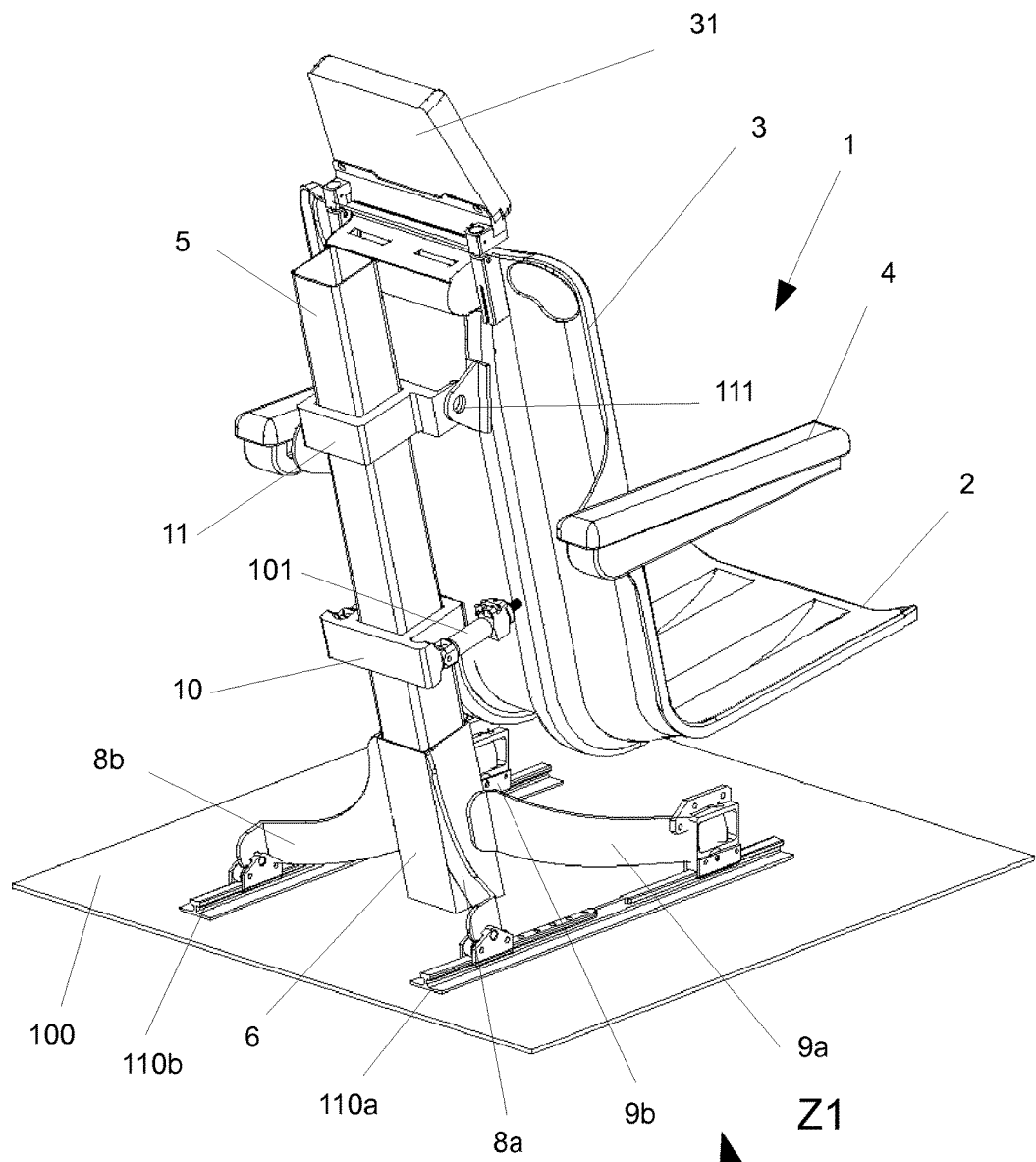
FIG. 6 illustrates in a simplified way in perspective an aircraft seat according to the invention, as seen from the rear.

As can be seen in FIG. 6, intended to understand the principle of the invention more than to show the dimensions of the various elements, an aircraft seat conventionally comprises a seat bucket 1 composed of a seat pan 2, a seatback 3, armrests 4 and a headrest 31. The seat bucket 1, certain parts of which are optional (armrests, headrest, . . . ) and optionally articulated to one another for ergonomic adjustments needs, is of conventional shape and material in this field, for example made of metallic materials or of composite materials, and not explained in detail here. In a known way, the seat is oriented, at least during the takeoff and landing phases, along the longitudinal axis of the aircraft, taking into account accelerations undergone by the occupant of the seat during accelerations that can be encountered during an emergency braking or during a crash.

According to the invention, the seat bucket 1 is fastened by the seatback 3 by a rear part of the seatback to a guide beam 5 that is a structural beam.

The guide beam 5, located preferably near a vertical symmetry plane X, Z of the seat, extends generally parallel to a center line of the seatback 3, and therefore approximately perpendicularly to the floor 100, optionally slightly inclined from bottom to top toward the rear of the seat 1, along an angle of inclination of about twenty degrees in this example, along a main axis Z1.

The angle of inclination, advantageously between zero and twenty-five degrees toward the rear, is advantageously adapted as a function of the possible adjustments on the seat so as to simplify these other adjustments.

The fastening of the seatback 3 on the guide beam 5 is achieved by lower 10 and upper 11 attachment means that make it possible for said attachment means to slide along the guide beam 5, and thereby to change a position of the seat bucket 1 in a direction Z1 in relation to the floor 100 to make possible a height adjustment of said seat bucket, the height adjustment having a simultaneous effect on the longitudinal position of the seat bucket when the guide beam 5 is inclined in relation to the vertical. Types of height position adjustment means are known, for example in the case of column-type seats having two lateral beams, and are outside the scope of this invention.

In one embodiment, the upper attachment means 11 comprises, as illustrated in FIG. 6, a pivot pin 111 making possible a rotation of the seat bucket 1 in relation to the guide beam 5 around said pivot pin with an orientation parallel to the transverse axis Y. In this embodiment, the lower attachment means 10 comprises, on the one hand, an extendable device, such as a jack, for changing within certain limits the distance from a point of the seat bucket 1 in relation to the guide beam 5 and, on the other hand, a catch to hold said distance, the whole forming an inclination device 101 that makes possible the inclination adjustment of the seat bucket 1 by pivoting around the pivot pin 111.

In one embodiment, not shown, an equivalent result for obtaining an inclination of the seat bucket 1 consists in using a reverse arrangement in which the lower attachment means is just pivoting, and the upper attachment means makes it possible to change the distance from a point of the seat bucket to the guide beam.

The guide beam 5, in this nonlimiting example, has a length that is close to the height of the aircraft seat. It can, however, be notably shorter, and have, for example, a length not exceeding half the height of the seatback 3, so that it makes possible the fastening of the seatback 3 at at least a desired maximum height for the seat bucket 1.

It can also be longer, for example in the case of fastening said guide beam 5 in an upper part, for example at the level of a structure of the aircraft in an area of the ceiling of the cabin or of a bulkhead placed behind the seat.

The guide beam 5, formed here from a structural tube with a hollow rectangular cross-section, this shape of the cross-section, however, not being necessary and illustrated by way of example, is held mounted in a sleeve 6, which advantageously incorporates a vertical damper, not shown in FIG. 6, intended for the dynamic absorption of forces along the main axis Z1 of the guide beam 5.

In the case where such a damping device is incorporated into the sleeve 6, the guide beam, held approximately stationary by the damping device in ordinary conditions, slides in the sleeve 6 under the effect of forces introduced by accelerations whose downward vertical components that exceed a certain threshold can be likened to a crash situation.

As clearly comes out from the structure described of the seat of the invention, the width of the guide beam 5 is independent from the width of the seat.

The sleeve 6 is secured at two attachment points on each of two tracks 110a, 110b of the floor 100 of the aircraft by means of two posterior fastening feet 8a, 8b, and by two anterior fastening feet 9a, 9b, each equipped on their free end with an attachment interface corresponding to the geometry of the tracks 110a, 110b. The space between the ends of the fastening feet is adapted to the space of the attachment points on the tracks, conventionally 15 inches or 17 inches.

The sleeve 6 and the fastening feet 8a, 8b, 9a, 9b form a connecting structure of the guide beam 5 to the floor 100 of the aircraft.

In this example, the fastening feet 8a, 8b, 9a, 9b are made in the shape of structural arms formed at the level of the sleeve 6 and at the level of the attachment interfaces to make possible their fastening on the sleeve 6 and on the attachment interfaces on the tracks 110a, 110b. The guide beam 5 is preferably placed approximately at an equal distance from the tracks 110a, 110b.

The guide beam 5, the sleeve 6 and the fastening feet 8a, 8b, 9a, 9b are, for example, made of metal according to conventional processes of machining, forming and assembly, or of composite material, and sized to take up the extreme forces applied to the aircraft seats.

In one embodiment, the fastening feet 8a, 8b, 9a, 9b are designed so as to absorb a portion of the energy by plastic deformation to limit the accelerations sustained by an occupant of the seat during crash situations.

In one variant embodiment, not illustrated, the sleeve 6 or a mounting structure is incorporated into a structure of the floor 100, and the guide beam 5 is held mounted in said sleeve or said mounting structure. In this variant, a lower part of the guide beam 5 is placed to be fastened to the mounting structure, and in particular when the mounting structure of the floor is located under an upper surface of said floor, its length is adapted to be extended under said upper surface of the floor.

Such a variant makes it possible to avoid the use of floor tracks and simplifies the fastening of the seats, in particular when a longitudinal adjustment of the position of the seat is not necessary.

The design of an aircraft seat with a single-beam console, whose principle according to the invention has just been described, exhibits, in relation to the existing devices, several advantages.

It makes it possible in certain embodiments to install only a single device for each functionality (height/angle adjustment, compensation for movement, absorption of energy, . . . ) rather than at least two devices in the seats that have two lateral beams. Thus, the number of devices for the same number of functions is reduced. This is a major advantage in the context of the search for weight savings on any aeronautical equipment.

Moreover, the limitation of the number of parts used for performing the same functions simplifies the system, and therefore reduces the risks of breakdowns; the reliability of the whole is increased.

The central arrangement of the guide beam 5 makes it possible to clear the space occupied by the knees of a passenger located behind the seat, which makes it possible either to improve the comfort offered for a given space between two successive rows of seats or to reduce the interval between two successive rows of seats for equivalent comfort. Actually, in the case of console seats having two lateral beams, the spacing of the tracks for fastening to the ground in the alignment of which these structural beams find themselves corresponds in practice to the clearance of the knees. These beams therefore interfere with the knees of a passenger located right behind. The invention therefore improves the ergonomics of the position located behind the seat.

Furthermore, in the case where the beam is mounted in the floor of the aircraft, the passenger located in a seat behind the seat under consideration has the possibility of placing his feet on the floor on each side of the beam and without being bothered by structures for fastening the seat to the floor, particularly to floor tracks, his comfort thus being improved.

Also, the width of the bucket and the space between the two tracks are no longer directly linked in the invention, in contrast with the pre-existing devices, which provides an additional freedom in the choice of the width of the seat bucket without jeopardizing the support structure, the same support structure model being able to be used for different models of seat buckets.

The invention also makes possible a guide beam cross-section that is larger than for two lateral beams (for withstanding the same forces), thus furnishing an increased inertia and increased rigidity. This single beam is found closest to the vertebral column of the passenger and in its axis provides an increased protection of the person in comparison with the existing devices in certain crash situations and situations of significant deformation of the airframe of the aircraft.

The scope of this invention is not limited to the details of the embodiments considered above by way of example, but extends also to changes in the scope of a person skilled in the art.

FIGS. 7a to 7f illustrate a variant and details of embodiment of the invention. In this variant, in which the device for adjustment of the inclination of the seat bucket, optional, is not shown, the guide beam 5 with a mainly rectangular cross-section, a cross-section shown diagrammatically by way of embodiment example in FIG. 7e, comprises at least one slide 51a, 51b on each side, advantageously participating in the reinforcement of the guide beam, and extending along its main axis Z1. In the lower part, this guide beam 5 comprises a structure for connecting to the floor 100 of the aircraft that comprises, on the one hand, a one-piece posterior foot 8b to which said guide beam is rigidly attached (foot on the left side of the seat in the example illustrated—FIGS. 7a and 7b), and, on the other hand, an articulated posterior foot 8a, free in rotation around a transverse axis that is approximately parallel to the direction Y (foot on the right side of the seat in the illustrated example—FIGS. 7a and 7b), so as to create an isostatic mounting adapted to take into account normal deformations of the structure of the floor of the aircraft.

In this embodiment example, the one-piece posterior foot 8b and the articulated posterior foot 8a that are integral with the guide beam 5 each comprise an interface for attachment on a fastening position on tracks 110a, 110b. Moreover, each so-called stationary foot 8a, 8b comprises a part that can be extended in the direction X, forming the so-called adjustable anterior foot 9a, 9b that itself comprises in a forward part an interface for attachment on the tracks. This part that can be extended, for example by sliding an arm in the corresponding stationary foot or by mounting adjustable feet provided with arms of different lengths, makes it possible to adapt the seat to a separation of existing fastening points of an aircraft floor in the direction of the longitudinal axis.

The seatback 3 of the seat bucket 1 comprises on its rear part structural stiffeners 12a, 12b placed symmetrically on both sides of the center line of the seatback 3, and spaced so as to make possible the passage of the guide beam 5. The structural stiffeners 12a, 12b slide, for example by means of pads or rollers integral with said stiffeners, in anterior slides 51a of the guide beam 5. They are furthermore integral with lower parts of two dampers 7a, 7b, located on both sides of the guide beam 5, at the level of posterior slides 51b. The dampers 7a, 7b are integral by an upper part with the top part of the guide beam 5.

By such an arrangement, the dampers 7a, 7b absorb energy linked to approximately vertical forces generated by vertical accelerations, in particular in crash situations.

The characteristics of the dampers 7a, 7b depend here again on the extreme conditions of accelerations and of weight that the seats must support.

In one embodiment, not shown in the figures, the dampers 7a, 7b, or a single damper, are arranged on the inside of the guide beam, which makes it possible to obtain a more compact unit.

Figure 7A:
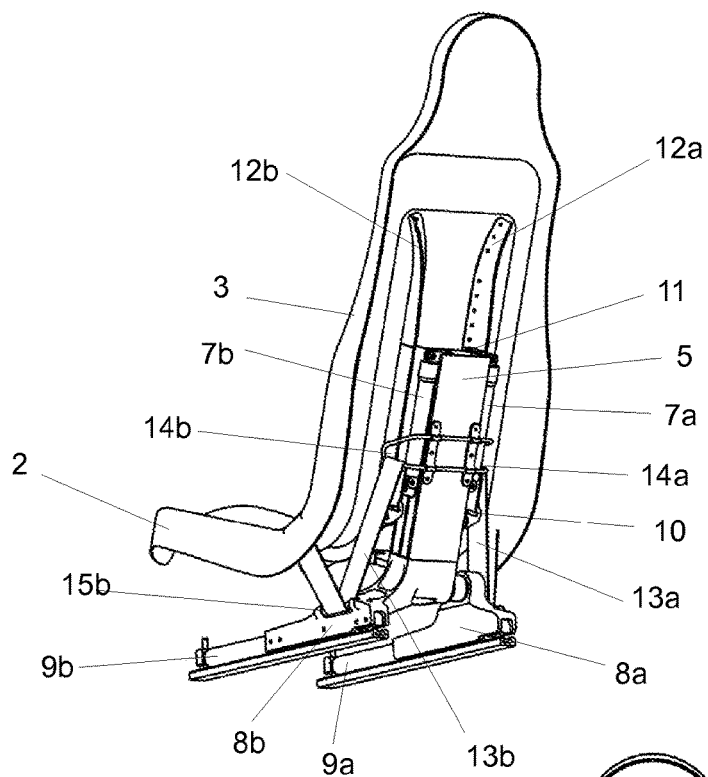
Figure 7B:
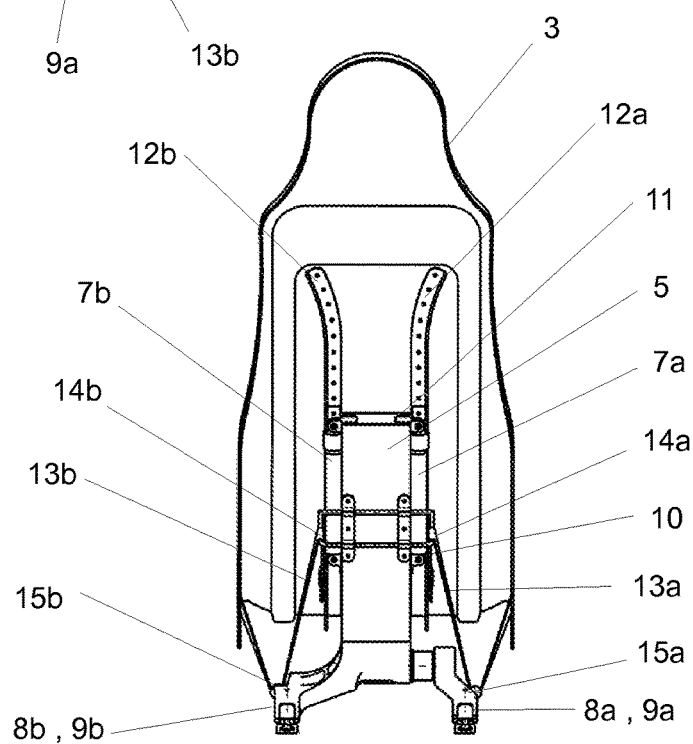
Figure 7F:
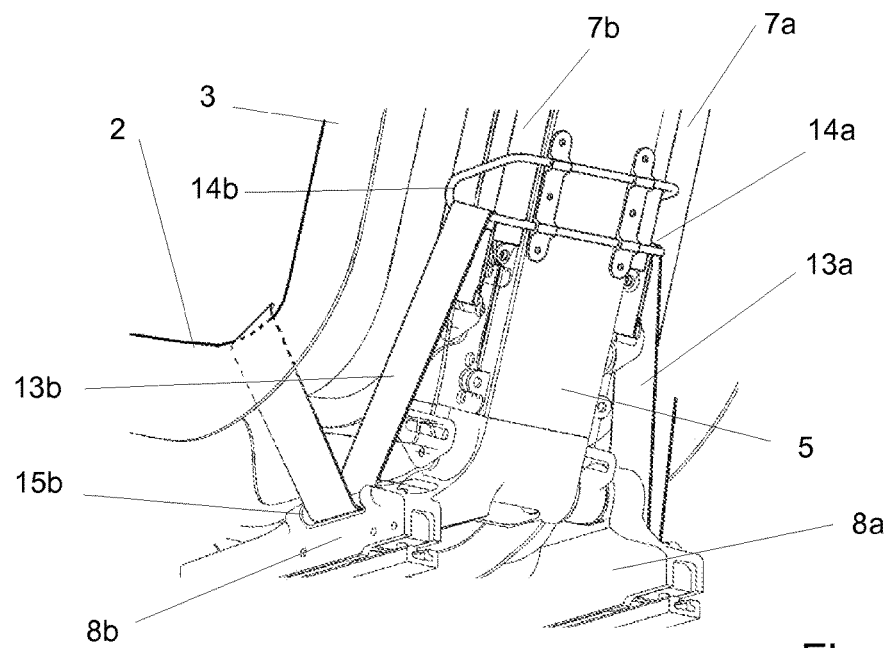

The seat of FIGS. 7a and 7b comprises a safety belt, present on all aircraft seats in accordance with regulations, formed by two half-belts 13a, 13b placed on each side of the seat and intended to be connected by an attaching buckle. Each half-belt 13a, 13b, which must withstand the forces during a crash situation, is attached by one end to a structural stiffener 12a, 12b that is integral with the seat bucket 1. It then goes through a first belt guide 14a, 14b that is integral with the guide beam 5, therefore stationary during vertical movements of the seat bucket in relation to the guide beam, then through a second guide 15a, 15b that is integral with the posterior foot 8a, 8b located on its side of the seat, therefore also stationary during vertical movements of the seat bucket in relation to the guide beam, before going up above the seat pan 2, advantageously through passage openings in the lateral edge of the seat pan 2, to be fastened to the other belt part, when the latter is attached.

In this way, when the seat bucket 1 of the seat moves along the main axis Z1 of the guide beam 5, the belt length between the edges of the seat pan that holds the occupant of the seat remains generally unchanged. By this double passage through guides attached to the stationary structure, a device for compensation of the length of the safety belt is obtained here.

This device makes it possible, on the one hand, for the occupant of the seat to adjust a vertical position of the seat bucket when his belt is attached, without it being necessary to make use of inertia reel belts, and, on the other hand, to compensate for the length of the belt when the seat is moved downward to absorb the energy of a crash situation, the occupant of the seat being held in the seat without being excessively squeezed or loosened by the belt, a result that an inertia reel belt does not make it possible to achieve in the case of strong accelerations that are typical in a crash situation.

This device further makes it possible, by shifting the points for taking up the forces of the belt to the high-strength elements of the stationary structure of the seat, to reduce the forces at the level of the fastening of the belt to the bucket and therefore to avoid having reinforcements for the seat bucket 1 that are necessary in the solutions that consist in fastening the belt directly at the level of the seat pan 2.

Figure 8:
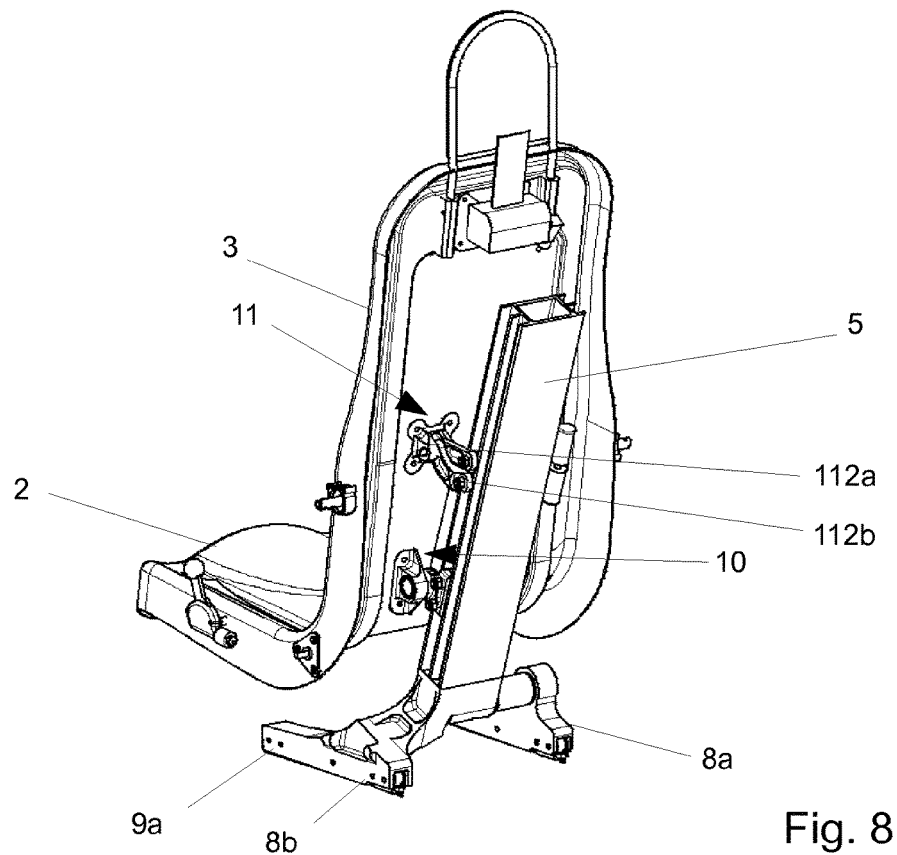
FIG. 8 illustrates, seen from the rear in perspective, another example of an embodiment of a seat according to the invention comprising an articulated foot and a device for adjustment of inclination of the bucket.

In a more specific variant of the use that is presented in detail above, illustrated in FIG. 8, the two feet 8a, 9a connected to the guide beam 5 are articulated around a transverse axis Y, and a brake or pawl mechanism, not shown, of standard type stops the inclination of the guide beam in relation to the foot under consideration and therefore the seat in a selected inclination in relation to the vertical. The other feet 8b, 9b are, as in the case described previously, left free in rotation, so as to be in a position to support the deformations of the floor, normal or exceptional, without introducing stresses into the structure of the seat as a result of a twisting of the floor.

In one embodiment, illustrated in the embodiment example of FIG. 8, the seatback 3 comprises, on each side of the guide beam 5, a fastener articulated at the level of the lower attachment 10 that slides freely in an anterior slide 51a of said guide beam. Furthermore, the seatback 3 comprises—offset in height in relation to the lower attachment, on each side of the guide beam 5 at the level of the upper attachment 11—a device for adjusting the distance of said upper attachment to said guide beam formed in the example illustrated by a fastening means having two independent arms 112a, 112b, subject by one of their ends to the same transverse axis of rotation at the level of the seatback 3, and by their other ends to a lock pin that slides in the anterior slide 51a. This device with two arms makes it possible to adjust the inclination of the seat bucket 1 by variation of the angle between the arms, an opening of the angle bringing the upper attachment 11 of the seatback of the guide beam 5 closer and conversely a closing of the angle moving said upper attachment away.

In a variant embodiment, the principles for making the upper and lower fasteners are reversed.

A damping device ensures the holding in a selected position of the seat bucket 1 along the guide beam 5 while ensuring a mechanical link between said guide beam and a take-up point of said seat bucket, advantageously at the level of one of the upper or lower attachments. In the case of dynamic stress downward on the seat, the seat bucket 1 will have a tendency to slide downward while remaining guided along the anterior slide 51a, the energy being then absorbed by one or more dampers, not shown in FIG. 8, placed on one or both sides of the guide beam 5, for example at the level of posterior slides 51b, or else placed inside the guide beam 5, and connected to the attachment points of the seatback 3 by at least one recoil wire.

The invention therefore makes it possible to produce a seat of a design that is both simpler than according to the known designs and that can incorporate devices for absorption of energy while having improved ergonomic characteristics.

A seat according to the invention is thus particularly suited to equip helicopters whose standards in the area of protection of the occupants in situations of vertical crashes are particularly stringent.

An aircraft provided with such seats makes it possible to benefit from a reduced weight of the accommodations and from a better use of the space of the cabin and of the pilot compartment.

The invention claimed is:

1. Aircraft seat comprising:
   a seat bucket (1), which establishes a longitudinal direction X forward of the seat and a vertical direction Z above the seat, said seat bucket comprising a seatback (3) and a seat pan (2) integral with said seatback, and
   a single structural guide beam (5), located in a rear part of the seat, oriented in an approximately vertical or inclined direction Z1 in relation to the vertical direction Z in a plane XZ determined by the longitudinal direction X and vertical direction Z, on which said guide beam the seat bucket (1) is fastened,
   said guide beam (5) being integral with a connecting structure for connecting said guide beam to a floor (100) of an aircraft,
   said connecting structure comprising,
      at least four fastening points, for fastening to said floor, distributed along two lines that are approximately parallel to the longitudinal direction X and that are apart from a vertical plane of symmetry XZ of said seat, and
      a mounting sleeve (6) of the guide beam (5) and with which sleeve four feet (8a, 8b, 9a, 9b) are integral and at the free ends of the four feet the fastening points are placed.

2. Aircraft seat according to claim 1, wherein the seat bucket (1) is held in front of the guide beam (5) by two attachment parts (10, 11) that are integral with the seatback (3) on a rear face of said seatback and apart from one another in the direction Z1.

3. Aircraft seat according to claim 2, wherein the two attachment parts (10, 11) that are integral with the seatback (3) slide along the guide beam (5) in the direction Z1 and comprise a device for locking the position in the direction Z1 of at least one of said two attachment parts.

4. Aircraft seat according to claim 3, wherein two of the four feet (8b, 9b) of a same line of fasteners that is approximately parallel to the direction X of the connecting structure are rigidly connected to the guide beam (5) and wherein another two of the four feet (8a, 9a), rigidly integral with one another, of another line of fasteners are fixed in an articulated manner, along an axis Y oriented perpendicularly to the plane XZ, in relation to a sub-unit formed by the guide beam (5) and the two feet (8b, 9b) that are rigidly connected to said guide beam.

5. Aircraft seat according to claim 4, wherein the two feet (8b, 9b) of the same line of fasteners that are approximately parallel to the direction X of the connecting structure rigidly linked to the guide beam (5) are linked by means of an articulation around the axis Y, said articulation comprising a device for locking in rotation.

6. Seat according to claim 5, wherein two of the four feet (8a, 9a) (8b, 9b) of a same line of fasteners that is approximately parallel to the direction X comprise a stationary part (8a, 8b), provided with an interface for a fastening point on the floor (100) that is integral with the guide beam (5), and an adjustable part (9a, 9b), also provided with an interface for a fastening point, the adjustable part (9a, 9b) being integral with the stationary part (8a, 8b) and being able to slide in relation to the stationary part (8a, 8b) in a direction X that is parallel to the lines of fastening points, with at least one space between two floor (100) fastening points or that can be changed in length in the direction X.

7. Aircraft seat according to claim 4, wherein the two feet (8a, 9a) (8b, 9b) of the same line of fasteners that is approximately parallel to the direction X comprise a stationary part (8a, 8b), provided with an interface for a fastening point on the floor (100) that is integral with the guide beam (5), and an adjustable part (9a, 9b), also provided with an interface for a fastening point, the adjustable part (9a, 9b) being integral with the stationary part (8a, 8b) and being able to slide in relation to the stationary part (8a, 8b) in a direction X that is parallel to the lines of fastening points, with at least one space between two floor (100) fastening points or that can be changed in length in the direction X.

8. Aircraft seat according to claim 4, further comprising a safety belt that is integral with the seat bucket 1, said safety belt having a free length on an interior side of the bucket that is a function of morphological characteristics of a passenger and in which said belt from each fastening point of the belt to the bucket passes through a first guide (14a, 14b) that is integral with the guide beam (5), located at a height greater than the attachment to the bucket, then passes through a second guide (15a, 15b) that is integral with a foot of the corresponding side (8a, 8b), located at a height lower than the first guide and at a height lower than the seat pan (2), and then rises above the seat pan.

9. Aircraft seat according to claim 2, wherein the structure for connecting the guide beam (5) to the floor (100) comprises a mounting sleeve (6) of the guide beam (5) and with which sleeve four feet (8a, 8b, 9a, 9b) are integral and at the free ends of which feet the fastening points are placed.

10. Aircraft seat according to claim 1, wherein the guide beam (5) slides in a direction parallel to Z1 in the sleeve (6) and is held in the direction of sliding by a damping device with an approximately vertical axis.

11. Aircraft seat according to claim 10, wherein the feet (8a, 8b, 9a, 9b) are placed to absorb, by deformation, energy linked to a force, a vertical component downward of which exceeds a predefined threshold.

12. Aircraft seat according to claim 1, wherein the four feet (8a, 8b, 9a, 9b) are placed to absorb, by deformation, energy linked to a force, a vertical component downward of which exceeds a predefined threshold.

13. Aircraft seat according to claim 1, wherein one of the two attachment parts (10) (11) that are integral with the seatback (3) comprises a pivot pin (111) for articulation of the seatback around an axis parallel to a direction Y that is perpendicular to the plane XZ, and the other attachment part (11) (10) comprises an extendable part (101) for locally changing a distance from said seatback to the guide beam (5).

14. Aircraft seat according to claim 13, wherein the guide beam (5) comprises at least two slides (51a) that are approximately symmetrical in relation to a vertical symmetry plane XZ of said guide beam in which slides the attachment parts (10, 11) that are integral with the seatback (3) are mounted to slide freely.

15. Aircraft seat according to claim 14, wherein the attachment part comprising an extendable element comprises at least two arms (112a, 112b) sliding in an anterior slide (51a) at independent ends and pivoting around a common axis parallel to the direction Y linked to the seatback (3) at other ends of said at least two arms to form an angle that can be changed.

16. Aircraft seat according to claim 1, wherein the guide beam (5) comprises a fastener in an upper part of said guide beam for connection to a ceiling structure or to a structure of a bulkhead of an aircraft.

17. Aircraft comprising at least one aircraft seat according to claim 1.

\* \* \* \* \*